3,163,638
EXTRACTION OF RIBONUCLEIC ACID
Manji Miwa and Tatsuro Kagami, Inuyama, Japan, assignors to Toyo Boseki Kabushiki Kaisha, and Takeda Chemical Industries Ltd., Osaka, Japan
No Drawing. Filed Dec. 22, 1961, Ser. No. 161,392
Claims priority, application Japan, Dec. 28, 1960, 35/51,110
5 Claims. (Cl. 260—211.5)

The present invention relates to a process for the production of ribonucleic acid, and more particularly to a novel method of extracting ribonucleic acid from yeast.

Ribonucleic acid (hereinafter sometimes referred to as RNA), as is described, for example, in "The Nucleic Acids" by E. Charyaff and J. N. Davidson (Academic Press, New York, 1955), is an organic compound which is considered to be a polymeric nucleotide, each nucleotide consisting of a combination of phosphoric acid, a sugar (i.e. D-ribose) and purine or pyrimidine, and this compound is present in yeast, other microorganisms and further in all types of cell, both plant and animal.

Since yeast is not only readily available but also is a microorganism which is especially rich in RNA, there have been made various studies on the extraction of ribonucleic acid from yeast. Thus, for example, those proposed by G. Clark, G. B. Schryver (Biochem. J. 11 319 (1917)), and by A. M. Crestfield, K. C. Smith, F. A. Allen (J. Biol. Chem. 216 185 (1955)) may be mentioned. However, these known methods have primarily been developed for the purpose of biochemical study on the role which RNA was supposed to play in life, and accordingly are not adaptable for industrial purpose on a large scale.

With the recent discoveries of great commercial and industrial utility of RNA, such as pharmacological activity of RNA and its derivatives, usefulness of 5'-purine base nucleotide (to be produced from RNA) in the food industry, etc., the demand for RNA has increased far beyond the sample quantity hitherto available only for research purposes.

It is the primary object of the present invention to produce ribonucleic acid economically on an industrial scale.

It is a more particular object of the present invention to provide a novel and economically feasible method for extracting ribonucleic acid from a large mass of yeast.

Another object of the present invention is to utilize waste sulphite liquor in the extraction of ribonucleic acid from yeast.

It is a still further object of the present invention to provide an effective and economical method for extracting ribonucleic acid from yeast produced by fermentation on a culture medium comprising a spent sulphite cooking liquor or waste sulphite liquor.

Briefly, these objects of the invention are attained by subjecting an aqueous yeast slurry containing a sulphite waste liquor as separately added or an aqueous yeast-spent wort slurry resulting from the fermentation of yeast on a culture medium comprising a sulphite waste liquor, to heat treatment, separating the liquid part from the slurry so treated, and recovering ribonucleic acid from the separated liquid.

We have found that a spent sulphite cooking liquor or waste sulphite liquor, the well known waste product from sulphite pump mills, preferably when diluted, is an excellent extracting medium for extracting ribonucleic acid from yeast. It has also been found that the liquid part of a spent wort discharged with propagated yeast from a fermentor wherein the yeast has been fermented on a culture medium containing a waste sulphite liquor is also useful, preferably when diluted, as an extracting medium for extracting ribonucleic acid from yeast.

While not fully understanding the exact mechanism by which such waste sulphite liquor or spent wort liquor can effectively extract ribonucleic acid from yeast, and, therefore, not desiring to limit the invention to any particular theoretical considerations, it is believed that certain component(s) (presumably lignosulfonate) contained in a waste sulphite liquor would make these liquors useful as the extracting medium, because common components of these liquids are of course those contained in the waste sulphite liquor. In this connection, it should be pointed out that when a waste sulphite liquor is used as a culture medium for the fermentation of yeast, only a very small amount of its components (particularly only a portion of fermentable sugar) is consumed by yeast and therefore the components of the spent wort (except yeast) discharged from the fermentor are substantially identical (although not exactly identical) to the initial components of the waste sulphite liquor employed in the culture medium.

In other words, it can be mentioned in any event that solid matter as present in a waste sulphite liquor would render the aqueous solution useful as RNA extracting medium.

The present invention is applicable to any yeast (whether dry or live) fermented in any manner on any culture medium, but it is preferable to apply the same to yeast propagated on a culture medium comprising a waste sulphite liquor because, as aforementioned, the spent wort liquor discharged from the fermentor can be utilized in the extraction at the stage of separation of yeast from the spent liquid. Spent sulphite cooking liquor or waste sulphite liquor is well known waste product from sulphite pulp mills and is a very cheap material. Any usual waste sulphite liquor can be employed in carrying out the present invention.

While the composition of waste sulphite liquor is subject to some variation depending upon the type of wood and the method and degree cooking in the pulping process, an average composition may be given, by weight percent, as follows: total unvolatile residual solid about 10–15%, lignosulfonate about 5–8%, total sugar about 2.5–4.5%, fermentable sugar about 1–3.5%, total sulfur about 0.8–1.2%. The liquor is colored dark brown.

It is well known to produce yeast on a medium comprising a spent sulphite cooking liquor or waste sulphite liquor, and, so far as reported, there are several commercial plants in operation today engaging in the production of yeast by utilizing a waste sulphite liquor. This process, in principle, comprises the following procedures:

A waste sulphite liquor is stripped (usually by steam) to remove volatile sulfur dioxide and, if desired, then passed through a bed of lime stone to reduce its acidity. After this treatment, the waste sulphite liquor is charged into a fermentor with nutrients and ammonia. The fermentor is so designed by special aerating equipment that yeast is induced into a normal aerobic fermentation and rapid propagation of yeast occurs. The propagated yeast is discharged from the fermentor together with the spent wort (or effluent) and is fed to a centrifuge where it is separated into a yeast suspension (which is referred to also as yeast cream or yeast slurry) and spent wort. Then the yeast slurry is subjected to alternately repeated concentration and washing with water by means of centrifuge until the spent wort is substituted with water to obtain a clean yeast cream or slurry, which is then dried. The process is described in more detail, for example, in Industrial Engineering Chemistry 43 8 (1951).

Although the above mentioned process is a typical one for the production of yeast by utilizing a culture medium containing a waste sulphite liquor, any other process may be employed to obtain an aqueous yeast slurry containing the spent wort (or waste sulphite liquor spent in the fermentation of yeast) to which the present invention is conveniently applicable as fully described hereinlater. Thus, any particular process for the preparation of such yeast slurry does not constitute a part of the invention, and the only requirement is to produce a yeast slurry containing spent wort by any process wherein a culture medium containing a waste sulphite liquor is employed.

We have found that the above mentioned yeast slurry or yeast cream which still contains the spent wort (or waste sulphite liquor spent in the fermentation) or yeast cream which has not yet been cleaned is useful in the extraction of ribonucleic acid from the yeast. Furthermore, we have also found that, generally, a waste sulphite liquor as such or a spent wort resulting from the fermentation of yeast in a waste sulphite liquor type medium is equally useful as a medium for extracting ribonucleic acid from yeast. As mentioned before, the ingredients (or solid matter) in a waste sulphite liquor can be regarded as to be substantially identical with those of the waste wort liquor after it has been served in yeast fermentation, and it is, therefore, believed that certain component(s), probably lignosulfonate, as present in waste sulphite liquor would make these liquors useful as extracting medium. For convenience of explanation, this kind of liquor is hereafter referred to as "liquor containing WSL components."

In carrying out the method of this invention, an aqueous slurry of yeast in a liquor containing WSL components is prepared or utilized. For this purpose, yeast is mixed with a waste sulphite liquor or a liquor containing WSL components. However, when yeast is produced by fermentation on a culture medium containing waste sulphite liquor, a yeast slurry discharged from the fermentor can be utilized, if necessary by substituting the spent wort partly with water so as to obtain a desired composition of the slurry.

The composition of the yeast slurry to be employed for the extraction of ribonucleic acid according to this invention can vary over a wide range, but it is preferable that the concentration of yeast in from 3 to 15% by weight (calculated on dry basis) and that the concentration of the WSL components is from 0.2 to 5.0% by weight (on dried solid residual basis).

The suitable pH of the slurry for extraction of ribonucleic acid is within the range from 4 to 9, preferably from 5 to 7.5. The pH of the slurry may be adjusted by any suitable means such as by the addition of an alkaline substance, e.g. caustic soda. If the pH is below 4 or above 9, there is a tendency toward depolymerization of ribonucleic acid. Therefore it is preferable to avoid the pH outside the above range.

For extraction of ribonucleic acid the yeast slurry is heated, preferably with stirring. The time and temperature of this heat treatment may vary over a wide range depending on the type of yeast, desired extraction yield of ribonucleic and the amount of the yeast slurry to be treated. Generally, heat treatment at a temperature of from 90° C. to about 120° C. (super-atmospheric temperature) for about 30 minutes to about 300 minutes is satisfactory, and generally the higher the temperature, the shorter may the treating time be. It is most convenient to heat the slurry at its boiling point (about 100° C.) for 50 to 200 minutes.

During the heat treatment ribonucleic acid contained in the yeast is dissolved into the liquid phase or the extracting medium. After this heat treatment, the yeast cream or slurry is subjected to a solid-liquid separation by any suitable means such as filtration or centrifugation, and the liquid part is recovered for separating the extracted ribonucleic acid therefrom.

The recovery of ribonucleic acid from the said liquid part may advantageously be carried out by acidifying the same to a pH of from 1.5 to 3.5 with any suitable acid, for example, an inorganic acid such as hydrochloric acid, sulfuric acid, phosphoric acid, etc., organic carboxylic acid such as acetic acid, monochloroacetic acid, etc. and other acids such as organosulfonic acid. By this acidification ribonucleic acid precipitates, and the precipitate can be collected by any usual manner such as filtration or centrifugal separation, which latter is preferred because the sedimentation of the ribonucleic acid is accelerated by a centrifuge.

By the above described method of this invention ribonucleic acid can be extracted from yeast in a good yield. Thus, for example, when the process of this invention is applied to the live yeast which has been obtained by subjecting yeast to a continuous aerobic fermentation on a medium comprising a waste sulphite liquor and then discharging the propagated yeast from the fermentor during the growth stage, crude nucleic acid (organic phosphorous content of 8.0%) is obtained in a yield of 4 to 6% based on the yeast.

The crude ribonucleic acid thus obtained can be used as such (without purification) for industrial purpose. For example, the crude ribonucleic acid may be hydrolyzed by a known manner to ribonucleotide useful in the food industry. If desired, the crude ribonucleic acid may be purified by any known method, such as Sevag's method (refer to M. G. Sevag, et al., Journal of Biological Chemistry 124 425 (1938)).

As mentioned before, the present invention is applicable to any yeast whether dry or live. Suitable types of yeast are, for example, *Hansenula anomala, Endomyces vernalis, Saccharomyces cerevisiae, Candida tropicalis, Torulopsis utilis, Mycotoryla japonica, Oidium lactis*, etc., among which *Torulopsis utilis* is preferable because of its high propagation potential.

The following examples are given only for purposes of illustration. All percentages given in these examples are by weight.

*Example 1*

After usual pretreatment such as stripping, a waste calcium-base sulphite liquor from pine pulping and containing 12.7% of total nonvolatile residual solid (lignosulfonate 7.8%, total sugar 4.3%, fermentable sugar 3.2%) was fed along with a small amount of sub-nutrient material (potassium chloride, diammonium phosphate and ammonia) into a continuous fermentor (modified Waldhof type fermentor). The pH of the charged fermentation mixture (wort) was about 5.0. Yeast predominantly composed of torulopsis utilis was propagated in the fermentor with a holding time of 6 hours, at 33° C. and with aeration. The propagated yeast was taken out of the fermentor with the effluent or spent wort and subjected to alternate centrifugation and washing with water. This alternate operation was repeated twice to obtain a yeast cream or slurry having a yeast concentration of 11.5% on dry basis and containing 2% of solid components (dried residual solid) in the spent wort. Therefore, it may be assumed from the solid content in the original waste sulphite liquor fed to the fermentor that the liquid part of the yeast cream now obtained corresponds to about 6.3 times dilution of the said initial waste liquor.

One kg. of this yeast cream was adjusted to pH 7 with caustic soda and then boiled in a stainless steel autoclave for 90 minutes while stirring. After the heat treatment the slurry was cooled to 5° C. and filtered through a filter press to recover the liquod part (filtrate or extract). After the filtrate was adjusted to pH 3.0 with a dilute hydrochloric acid to precipitate the extracted ribonucleic acid, which is separated and collected by centrifugation. The collected ribonucleic acid was washed with water, and dried under vacuum to obtain 6.3 grams of crude nucleic acid powder. The crude nucleic acid thus obtained contained 8% of organic phosphorous according to colorimetric determination of phosphate by Allen's method (refer to R. J. L. Allen; Biochem. J. (London) 34 858 (1940)), which corresponds to a yield of 5.5% based on the yeast.

The crude nucleic acid was purified by Sevag's method (refer to M. G. Sevag et al., J. Biol. Chem. 124 425 (1938)), and the resultant pure nucleic acid was hydrolyzed with hydrochloric acid. A paper chromatography of the nucleotide thus obtained revealed that, based on the pure nucleic acid, it contained 57% of purine base part which can be used as material for the production of 5'-inosinic acid and 5'-guanylic acid.

Example 2

On a culture medium comprising a waste calcium-base sulphite liquor from beech pulping and of total unvolatile residual solid content 13.0% (lignosulfonate 5.7%, total sugar 3.6%), torula-type yeast was fermented under aerobic condition in the same manner as in Example 1. The propagated yeast with the spent wort or effluent from the fermentor was centrifuged and washed with water to obtain a yeast cream or slurry having a yeast concentration of 10.5% on dry basis and containing 4.3% of solid (dried residual solid) in the spent wort.

One kg. of this cream was adjusted to pH 6.5, and extraction was carried out in an autoclave for 70 minutes at 100° C. After the heat treatment, the yeast cell was removed and the liquid part or extract was adjusted to pH 2.0 with a dilute hydrochloric acid to precipitate ribonucleic acid, which was separated and collected by means of a centrifuge, and then washed with water and dried to obtain 5.7 g. of crude nucleic acid (organic phosphorous content 8.0%) powder.

Example 3

The dry torula yeast prepared for food and fodder use by the fermentation on a culture medium comprising a waste sulphite liquor as in Example 1 was added to and mixed with a liquor containing 2% of solid matter and prepared by diluting 6.3 times the waste sulphite liquor used in Example 1, so that a yeast slurry containing 5% of yeast was obtained.

One kg. of this slurry (adjusted to pH 6.5) was heated for 120 minutes at 100° C. while stirring, and filtered. From the filtrate 2.4 grams (yield 4.8% based on the yeast) of crude nucleic acid (organic phosphorus content 7.3%) were obtained.

The crude nucleic acid was purified in the same manner as in Example 1, and was then hydrolyzed. A paper chromatography of the nucleotide thus obtained revealed that it contained 56% of adenine- and guanine-base nucleotides.

Example 4

This example illustrates the extraction of ribonucleic acid from the yeast fermented on a medium other than that containing a waste sulphite liquor.

Baker's yeast was fermented on molasses in a jar fermentor.

To an autoclave was charged a dilute waste sulphite liquor from beach pulping and containing 3.3% of solid, i.e. a solution prepared by diluting 4 times the waste sulphite liquor used in Example 2. The above mentioned baker's yeast was added to this solution to obtain 100 parts of a yeast slurry (pH 6.5) containing 8% of the yeast. The slurry was heated at 110° C. for 100 minutes while stirring. After cooling, the slurry was filtered and the filtrate was adjusted to pH 2.5 with acetic acid, and then centrifuged to sedimentate and separate ribonucleic acid. In this manner, 0.22 part (yield 2.7% based on the yeast) of crude nucleic acid (organic phosphorous content 7.1%) was obtained.

Example 5

Example 4 was repeated except that yeast such as brewer's yeast or sake yeast produced on a medium other than that containing a waste sulphite liquor was employed as the yeast and various ordinary waste sulphite liquors obtainable from pulp mills were employed in preparing an aqueous medium for the extraction. In any case, ribonucleic acid could be extracted from the yeast in good yield.

What we claim is:

1. A process for extracting ribonucleic acid from yeast, which comprises subjecting an aqueous yeast slurry having a pH of from 4 to 9 and containing about 0.2 to 5% solid matter present in waste sulfite liquor and from 3 to 15% yeast to a temperature of from 90° C. to 120° C. whereby ribonucleic acid is extracted from the yeast, separating the liquid from the yeast, and recovering the extracted ribonucleic acid contained in the separated liquid.

2. A process for extracting ribonucleic acid from yeast according to claim 1 wherein ribonucleic acid is recovered from the separated liquid by acidifying the liquid to a pH of about 1.5 to 3.5 whereby the ribonucleic acid is precipitated.

3. A process for extracting ribonucleic acid from yeast according to claim 1, in which the yeast slurry is obtained from a slurry (mixture of propagated yeast and spent wort) discharged from a fermentor where the yeast has been fermented on a culture medium containing a waste sulphite liquor.

4. A process for extracting ribonucleic acid from yeast according to claim 1, in which the yeast slurry is prepared by mixing yeast and a waste sulphite liquor.

5. A process for extracting ribonucleic acid from yeast according to claim 4, in which the yeast is *Torulopsis utilis*.

References Cited in the file of this patent

UNITED STATES PATENTS

| | | |
|---|---|---|
| 2,387,040 | Redfern | Oct. 16, 1945 |
| 2,415,826 | Laufer et al. | Feb. 18, 1947 |